J. HARE.
Belt-Coupling.

No. 161,508. Patented March 30, 1875.

WITNESSES. INVENTOR.

UNITED STATES PATENT OFFICE.

JAMES HARE, OF PROVIDENCE, RHODE ISLAND.

IMPROVEMENT IN BELT-COUPLINGS.

Specification forming part of Letters Patent No. 161,508, dated March 30, 1875; application filed November 16, 1874.

*To all whom it may concern:*

Be it known that I, JAMES HARE, of the city and county of Providence and State of Rhode Island, have invented a new and valuable Improvement in Belt-Couplings; and I do hereby declare that the following is a full, clear, and exact description of the construction and operation of the same, reference being had to the annexed drawings making a part of this specification, and to the letters and figures of reference marked thereon.

Figure 1:
Figure 2:

Figure 1 is a representation of the coupling when ready for use, placed upon the belt. Fig. 2 is a sectional view, representing the belt and coupling cut through the center.

The letter B in Fig. 1 represents the coupling as it is when placed upon the belt A A, ready for use. In Fig. 2 will be seen the ends of the belt C C, after it is screwed into the coupling. It is not designed to screw the belt into the coupling until the ends touch each other, as it is designed to be long enough to allow the belt to be taken up should it become too slack.

This invention is designed for the attachment of round leather belts for driving machinery by the use of helical steel-wire springs, which, for round belts, are simply screwed upon the leather, the inside of the spring or coupling forming or cutting a thread on the leather sufficient to hold it firmly, the part of the spring yielding a little when screwed on, and always maintaining a contracting pressure on the leather, which serves to embed the spring into the leather. The action of the spring is the same when the spring is distended lengthwise, as it naturally contracts the diameter.

The advantage of the helical spring coupling for round belts is evident, first, from the evenness of the attachment, the spring embedding itself into the leather and presenting a perfectly even surface to the pulley, therefore avoiding all noise or jar that is consequent upon the use of most other fastenings; second, the equal tension maintained by the spring, preventing, in a measure, the belt becoming loose or slack; third, this fastening does not reduce the strength of the belt, as is the case where a hole is made through the end, and a wire inserted in the form of a hook, but the more it is pulled the firmer it holds, and cannot be pulled off from the belt.

What I claim is—

The method of uniting the ends of a round belt by means of a helical spring, substantially as described.

In testimony that I claim the above I have hereunto subscribed my name in the presence of two witnesses.

JAMES HARE.

Witnesses:
 CHAS. W. ADAMS,
 S. CLOUGH.